April 4, 1967
A. FOTI
3,312,795
GROUND PLANE CONTROL OF SWITCHING SURGE
INSULATION CHARACTERISTICS
Filed March 30, 1965
3 Sheets-Sheet 1
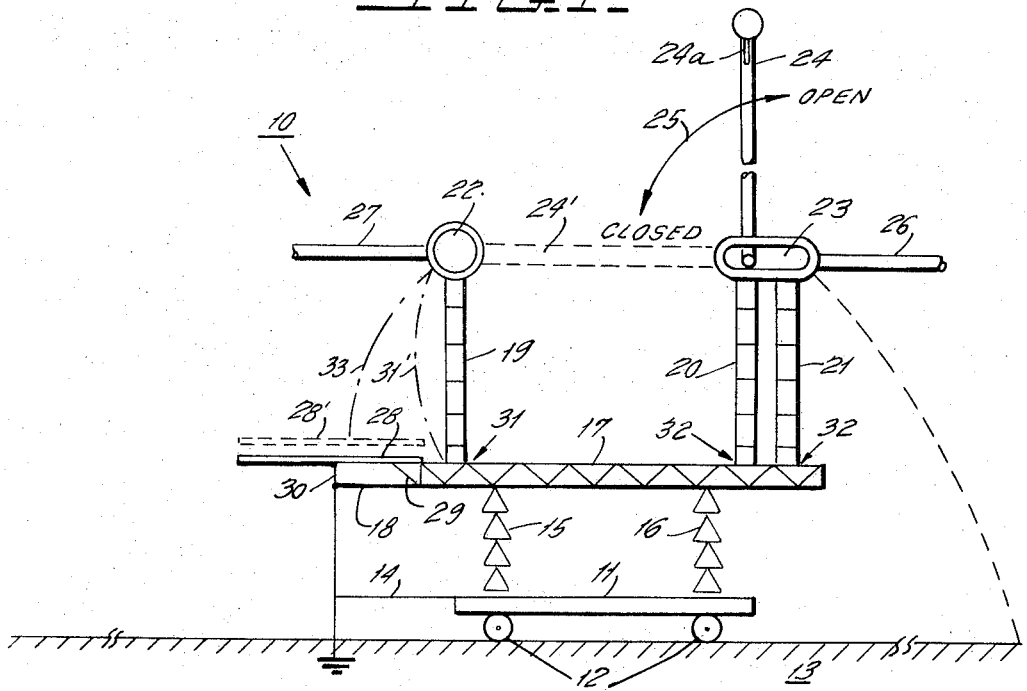
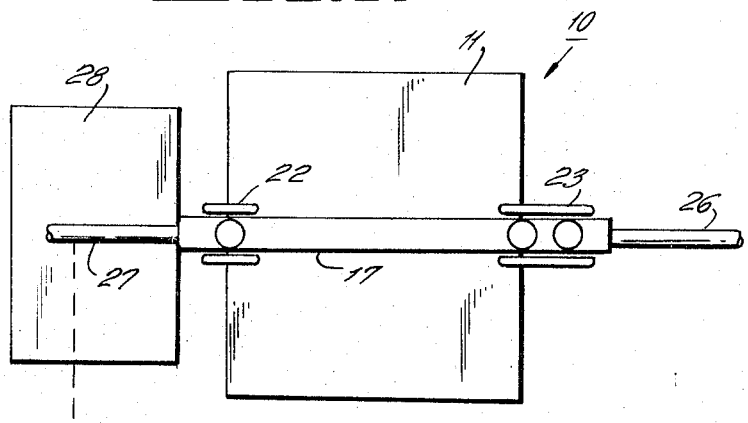
INVENTOR.
AREM FOTI
BY
OSTROLENK, FABER, GERB & SOFFEN
ATTORNEYS

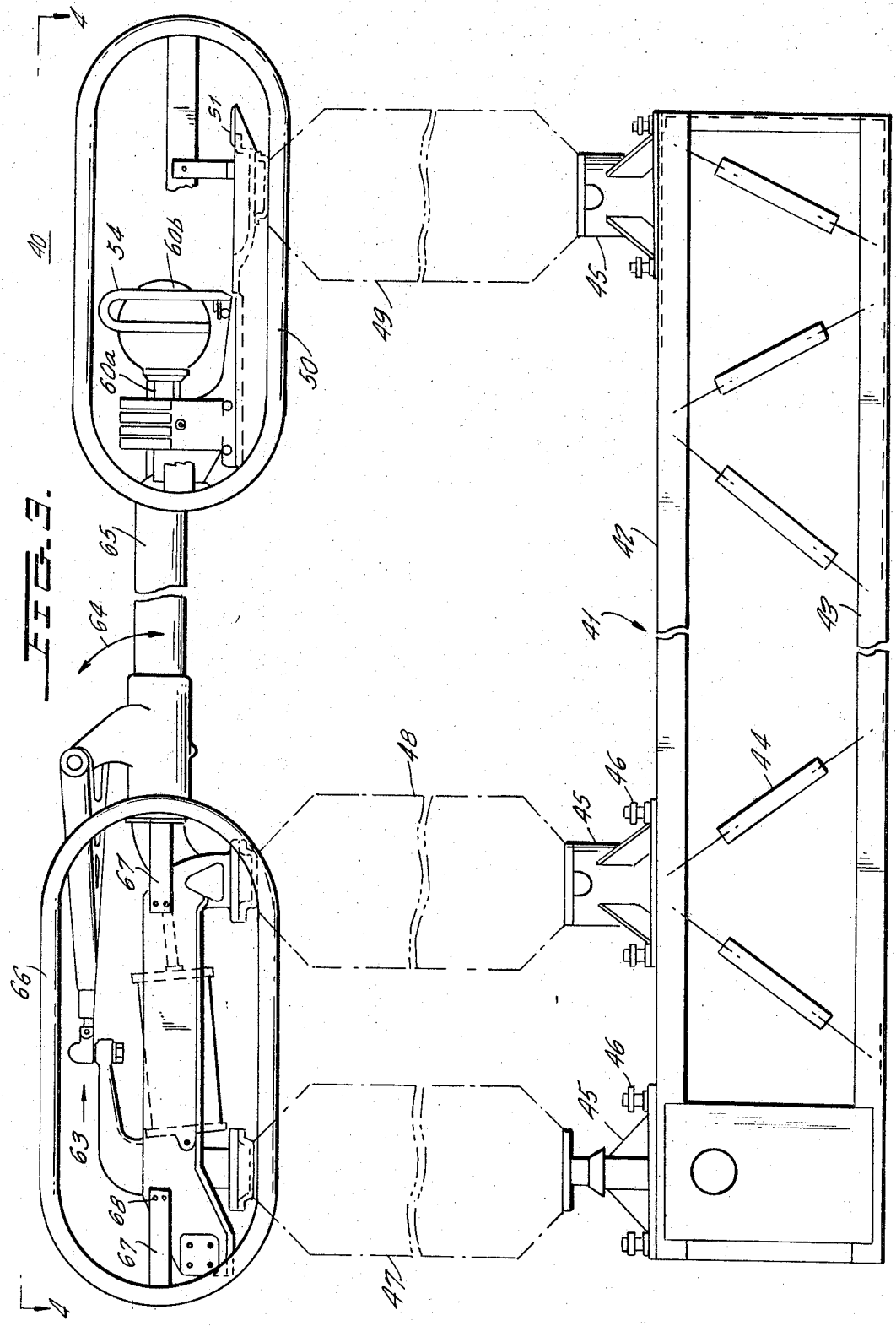

April 4, 1967 A. FOTI 3,312,795
GROUND PLANE CONTROL OF SWITCHING SURGE
INSULATION CHARACTERISTICS
Filed March 30, 1965 3 Sheets-Sheet 3
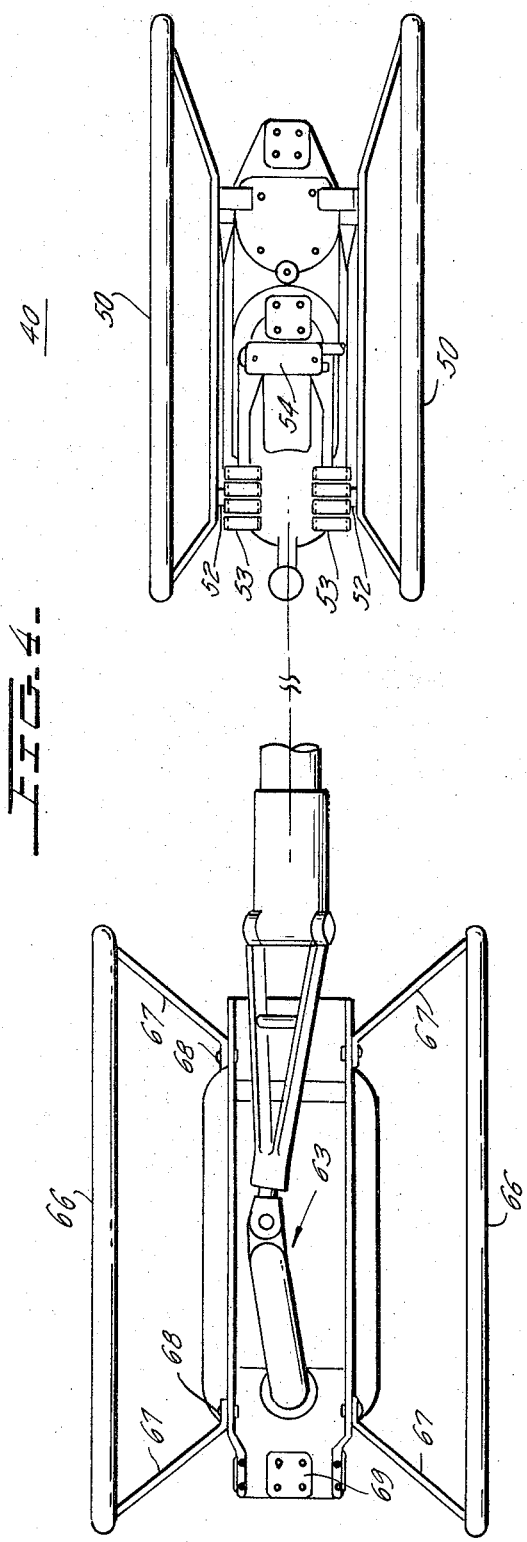
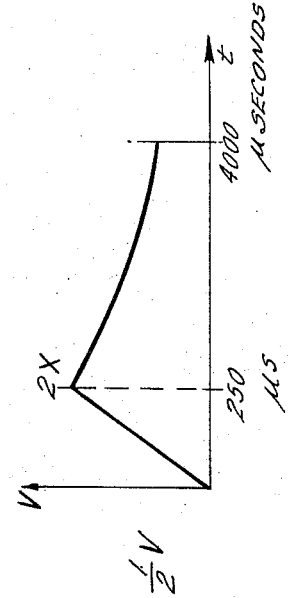
FIG.5b.
SWITCHING SURGE
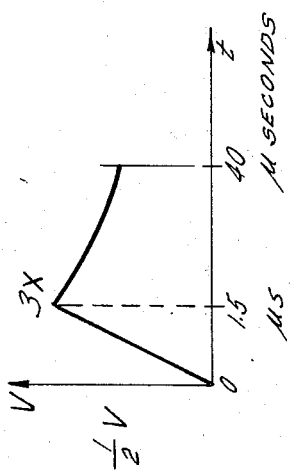
FIG.5a.
IMPULSE
INVENTOR.
AREM FOTI
BY
OSTROLENK, FABER, GERB & SOFFEN
ATTORNEYS

United States Patent Office 3,312,795
Patented Apr. 4, 1967

3,312,795
GROUND PLANE CONTROL OF SWITCHING SURGE INSULATION CHARACTERISTICS
Arem Foti, Greensburg, Pa., assignor to I-T-E Circuit Breaker Company, Philadelphia, Pa., a corporation of Pennsylvania
Filed Mar. 30, 1965, Ser. No. 443,833
7 Claims. (Cl. 200—48)

The instant invention relates to electric switches and more particularly to electric switches of the disconnect type mounted upon suitable supporting structures and which are provided with a novel ground plane appendage which substantially minimizes the spread in voltage levels between withstand and flashover voltage values without in any way altering the withstand voltage value for the disconnect switch.

Present day disconnecting switches are typically designed to isolate electrical apparatus and portions of electrical systems from energized lines for safe handling, maintenance, repair, and inspection. Regardless of the reason for use of a disconnect switch, it is most important to provide adequate protection for personnel working in the immediate region of the disconnected equipment. Thus, with the switch open, the gap in the open position must be adequate to withstand all normal, as well as abnormal, voltages impressed upon it by the system. If a surge voltage causes the switch open gap to flashover, the life of personnel may be seriously endangered.

Such disconnect switches are typically mounted upon a suitable grounded structure with the gap of the disconnect switch being such as to be much less likely to have a flashover occur across the gap than the likelihood of having a flashover occur between the energized parts and ground. Thus, since the switch open gap is designed to withstand more voltage than the insulation units which support the energized parts from the grounded metal base, this characteristic of a disconnect switch assembly is commonly referred to as its "withstand ability."

In order to further enhance the protective capabilities of a disconnect switch, one preferred approach is that of employing surge protection gaps which are located adjacent the lower end of the supporting insulators of the disconnect switch assembly and which are positioned in a direction pointing away from the region of the gap between the jaw and blade of the disconnect switch. The surge protection gaps are adjusted so that their flashover value is sufficiently below the flashover value of the switch open gap in order to insure line-to-ground flashovers under certain surge voltage conditions while the positioning thereof prevents ionized gas clouds from entering the space between the switch jaw and hinge to prevent a subsequent flashover of the switch open gap.

Exhaustive tests have been performed using the above described structure employing surge protection gaps in order to determine the withstand voltage level and the flashover voltage level of the structure. The flashover voltage level is defined as the minimum voltage at which a flashover will always occur. The withstand voltage level is defined as the maximum voltage at which no flashover will occur.

These tests have shown that there is a substantially large spread, or difference, between the withstand and flashover voltage levels. At differing voltage levels within the above identified range, it was found that, for the total number of energizations at each voltage level within the range, a portion of the energizations showed that the disconnecting switch assembly could withstand a voltage surge; a second portion showed that a switch open gap flashover would occur; a third portion showed flashovers from energized line parts to ground, while the remaining test shots at that voltage level showed that flashovers would occur in a random manner between the disconnect switch jaw, or hinge, and grounded planes located at distances many feet greater than the distance from the energized live parts to grounded base.

It is therefore a primary object of the instant invention to provide a novel grounded plane structure for use with disconnect switches and similar electrical components which substantially minmizes the spread or range between withstand and flashover voltage values of the line-to-ground insulation, as well as substantially eliminating any flashovers between the open switch and grounded planes located many feet away from the disconnect switch assembly.

The instant invention is applicable, for instance, to a disconnect switch, the line parts of which are mounted upon suitable insulating supports, the lower ends of which are, in turn, supported by a grounded base. The distance or gap between the switch hinge and the switch jaw is designed to be greater than the distance between these line parts and the grounded base of the insulators. This is done to insure that in the range of voltages greater than the withstand voltage level, flashover to ground will occur rather than a switch gap flashover.

The grounded base upon which the disconnect switch supporting insulators are mounted, is provided with a ground plane appendage which is a substantially rectangular-shaped planar conductive member physically supported by the switch base and electrically grounded. The ground plane appendage is positioned generally away from the region of the disconnect switch open gap for the reason recited previously. The positioning of the surge protection gap electrodes is set forth in detail in U.S. Patent 3,117,192, issued to J. B. Owens, Jan. 7, 1964 and assigned to the assignee of the instant invention. The discussion of electrode positioning set forth therein is incorporated herein by reference thereto. The grounded plane appendage is arranged so as to be substantially parallel to the conductors coupling the switch hinge and switch jaw into the electrical distribution network. Through the use of such a grounded plane appendage, exhaustive tests have shown that the spread arranged between a withstand voltage level and the flashover-to-ground voltage levels was substantially minimized and in addition thereto, no switch open gap flashovers or any other extraneous uncontrolled flashovers of any sort occurred within this range. In order to further insure flashovers-to-ground, the grounded plane appendage was positioned at an altitude, or height, slightly above the base support for the insulators which, in turn, support the disconnect jaw and hinge. This resulted in even more effective control over flashover conditions and substantially lowered the flashover voltage levels.

It is therefore one object of the instant invention to provide a novel ground plane appendage for use with disconnect switches and similar electrical components in order to substantially diminish the voltage difference between the withstand voltage level and the flashover voltage level.

Another object of the instant invention is to provide a novel ground plane appendage for use with disconnect switches and the like in order to substantially diminish the voltage difference between the withstand voltage level and the flashover voltage level of a disconnect switch wherein the ground plane appendage is a substantially planar conductive member supported by the disconnect switch base and electrically grounded.

Still another object of the instant invention is to provide a novel ground plane appendage for use with disconnect switches and the like in order to substantially diminish the voltage difference between the withstand voltage level and the flashover voltage level of a disconnect switch wherein the ground plane appendage is a substantially planar conductive member supported by the disconnect switch base and electrically grounded and wherein the grounded plane appendage is positioned relative to the switch open gap so as to minimize the probability of occurrence of a switch open gap flashover.

An additional object of the instant invention is associated with application of switches and insulators in contaminated locations where it is desirable to use insulators taller than normally required, to increase leakage distance to ground. In such cases the added leakage distance provides improved electrical performance of the line-to-ground insulation under power frequency conditions. However, users desire to accomplish this improvement without increasing the basic impulse level (B.I.L.) or without increasing the switching surge insulation level of the switch and the switch open gap—for economic reasons—because increase of the latter two levels involves in increase in all the physical dimensions. For such an application, therefore, the grounded plane appendage permits over-insulation to ground for power frequency voltages, exercising control over impulse and switching surge flashover voltages.

These and other objects of the instant invention will become apparent when reading the accompanying description and drawings, in which:

FIGURE 1 is a side elevational view of a switch set-up for laboratory test, employing the principles of the instant invention;

FIGURE 2 is a plan view of the test set-up of FIGURE 1;

FIGURE 3 is an elevational view showing a disconnect switch assembly of the type shown in FIGURES 1 and 2, in greater detail;

FIGURE 4 is a top plan view of the disconnect switch of FIGURE 3;

FIGURES 5a and 5b are plots showing the type of impulses applied to the apparatus of the instant invention during the tests performed on said apparatus.

Referring now to the drawings and more particularly to FIGURES 1 and 2, there is shown therein a disconnect switch assembly 10 comprised of a test carriage 11 supported on the ground 13 by means of the wheels 12. While the carriage is shown herein as being provided with wheels, it should be understood that in service a stationary non-movable structure is usually employed. The carriage 11 which is formed of a conductive material is suitably electrically grounded by means of the conductor 14.

The carriage 11 was provided as a matter of convenience with insulating supports 15 and 16 which act to rigidly position and support a switch base 17 which is preferably a rigid metallic structure. The switch base 17 is electrically grounded by a suitable conductor 18. The switch base 17 is provided with a plurality of insulator supports 19, 20 and 21, for the purpose of positioning and supporting the disconnect switch jaw 22 and the hinge 23, respectively, and to provide proper electrical insulation from live parts to ground. The switch hinge 23 rotatably supports a switchblade 24 which is arranged to move between its open and closed limits in a direction shown by arrows 25, with the movement of the blade 24 occurring in a vertically aligned plane. The switch hinge 23 further has electrically connected thereto a conductor 26 which may, for example, be connected to a voltage source.

The disconnect switch jaw 22 is designed to make rigid engagement with the spherical-shaped end 24a of switchblade 24 when the switchblade 24 is in the closed position as shown by the dotted line configuration 24'. The jaw 22 is further provided with suitable means for coupling a horizontally aligned conductor 27 thereto, which, for example, may be coupled to a load for energization by the source coupled to conductor 26.

The switch base 17 has further physically connected thereto a ground plane appendage 28 coupled to base 17 at 29. The ground plane appendage 28 is a substantially planar conductive member arranged substantially horizontally and substantially parallel to the conductor 27 and further, electrically grounded by a conductor 30.

In the case where a flashover-to-ground occurs in a disconnect switch structure which does not employ a ground plane appendage, such a flashover would occur between the disconnect switch jaw 22 and the region 31 of base 17 which is in the immediate vicinity of the base of insulator support 19. Also a flashover-to-ground may occur between the hinge 23 and the region 32 of base 17 which is in close proximity to the lower ends of insulator supports 20 and 21. A switch open gap flashover would occur in the region between the jaw 22 and hinge 23 and generally would appear in the region shown by the dotted line position 24' of the switch-blade 24.

A switch assembly of the general configuration shown in FIGURES 1 and 2, but without a ground plane appendage was employed for conducting the experiments to determine the withstand voltage level and the flashover-to-ground voltage level for the disconnect switch which was of the 500 kv. capacity type.

With the 500 kv. disconnect switch in the open position, i.e., the blade in the solid line position 24, and with the jaw 22 being energized and the hinge 23 and base 17 being grounded, 10 voltage stresses were applied to the jaw. The switching surge voltage stress imposed upon the jaw followed the curve shown in the plot of FIGURE 5b wherein the voltage surge is zero (0) volts at a time zero (0) reaches its maximum value 250 mcs. later and then diminishes to half the maximum value 400 mcs. later. Of the ten voltage stresses imposed, four were flashovers-to-ground occurring across the insulator column, as shown by dotted line 31'; three flashovers occurred across the switch open gap, i.e., between jaw 22 and hinge 23; and the remaining three were "withstands." A withstand is defined as a case when the switch insulator column (19, 20 or 21) and the switch open gap completely withstood the application of a voltage without any flashover whatsoever. The maximum voltage achieved during this test was 1640 kvs.

Performing the same test again with the maximum voltage achieved being 1700 kvs. and applying again ten such voltage stresses, it was found that five jaw insulator column flashovers from 22 to 31 occurred; and the remaining five tests resulted in switch open gap flashovers in the region 24' between jaw 22 and hinge 23.

The same test was repeated after removing the ground connection from the hinge end 23 of the switch and applying twelve voltage surges to the switch jaw 22. Of the twelve trials, four of these resulted in "withstands"; six flashovers occurred between jaw 22 and base 17, and two flashovers to a ground plane located 24 feet away occurred, as is represented by the dotted line 34, even though the distance from jaw 22 to base 17 was 12' 6".

When the switch open gap flashovers occurred, the switching surge voltage flashed across an air gap of approximately 180" (distance between hinge 23 and jaw 22) instead of flashing across the shorter 150" height which separates the jaw 22 from region 31 of base 17. Since good, acceptable switch design of outdoor air switches of the type shown in FIGURES 1 and 2 dictates that voltage flashovers should occur over insulation-to-ground rather than across a switch open gap, the problem then becomes one of effectively controlling the behavior of such extra high voltage switching surges.

Further tests were performed on a switch of the type shown in FIGURES 1 and 2 in the absence of a ground plane 28 to determine the maximum withstand voltage level and the minimum flashover voltage level where 100% flashovers-to-ground occurs. This represents a spread between withstand voltage and flashover-to-ground voltage of 420 kvs. The secondary problem to overcome is that of substantially decreasing the spread between the above mentioned values.

Substantialy identical tests to those described above were performed on a switch of the type shown in FIGURES 1 and 2 wherein the ground plane appendage 28 was added to the assembly. The ground plane appendage was positioned in the manner shown in FIGURES 1 and 2 at a distance of approximately 164″ from the potentially energized conductor 27. The ground plane appendage 28 was positioned in the manner shown in order to encourage any flashovers to occur in a direction away from the switch open gap in order to prevent the ionized cloud accompanying such a flashover from entering into the switch open gap region between jaw 22 and hinge 23.

With this arrangement a switching surge voltage having a maximum value of 1640 kvs. was applied to the switch jaw 22. For a total of 11 trials there resulted eight flashovers-to-ground with the flashovers occurring substantially along the path defined by dotted line 33; one switch open gap flashover; one withstand; and one flashover to a ground plane located over 24 feet away as represented substantially by the dotted line 34.

Comparing these results with those obtained without the use of a ground plane appendage, it can be seen that definite improvement occurs.

A further test was performed under identical conditions, except the ground plane appendage 28 was elevated to the position shown by the dotted line configuration 28′ such that the ground plane appendage was elevated by substantially 12″. Exhaustive tests using this configuration showed that the withstand voltage remained at 1400 kvs. and that a surge voltage of 1640 kvs. provided 100% flashover-to-ground voltages for a total of over 50 voltage stresses imposed. At no time during any of the 50 voltage surges imposed was there experienced any kind of flashover except down the jaw insulator 19. No switch open gap flashovers, nor any extraneous uncontrolled flashovers of any sort occurred. The large majority of flashovers noted from the potentially energized conductor terminated upon the ground plane appendage 28′ on the side of the insulator 19 opposite the switch open gap. It can be seen that through the use of the suitably positioned ground plane appendage, in addition to no uncontrolled or extraneous flashovers occurring during the tests, the spread between the withstand voltage level and the flashover-to-ground voltage level was cut almost in half when compared with the switch structure which did not employ a ground plane appendage.

All of the above tests were performed under dry test conditions. The disconnect switch assembly was then tested under wet test conditions, with the gratifying results that withstand voltages and flashover voltages for positive or negative polarity waves were 1200 kvs. and 1400 kvs., respectively, resulting in the spread therebetween being less than half of the spread existing for disconnect switches which do not employ a ground plane appendage.

Similar control of voltages is exercised when voltage stresses of the impulse variety are applied. Impulse voltage waves are typified by FIGURE 5a.

FIGURES 3 and 4 show the 500 kv. disconnect switch employed in the above test in greater detail. The disconnect switch 40, shown in FIGURES 3 and 4, is comprised of a base structure 41 formed of rigid base frames 42 and 43 which are rigidly secured to one another by reenforcing struts 44. Metallic base insulator supports 45 are rigidly secured to the base structure 41 by each of the base supports 45, in turn, rigidly support an insulating column 47–49, respectively. Insulating column 49 supports the disconnect switch jaw structure which is comprised of jaw corona shields 50 mounted to a jaw adapter 51 by spacer members 52. The jaw contacts 53 are designed to receive the narrow diameter portion 60a of switchblade 60 which is provided with a spherical end 60b designed to be received by the arcing horn assembly 54. The incoming conductor is suitably secured to the jaw adapter 51.

The hinge insulator columns 47 and 48 support a pair of adapter plates 61 and 62, respectively, which in turn supports the switchblade hinge structure 63, which structure is well known in the art and acts to rotate switchblade 60 in a direction shown by arrows 64, as well as rotating the switchblade 60 about its own longitudinal axis shown by center line 65. A detailed description of the manner in which the switchblade 60 is rotated about the hinge assembly 63 and simultaneously rotated about its longitudinal axis 65 is set forth in detail in U.S. Patent 2,673,902 issued Mar. 30, 1954, entitled, Disconnect Switch, by G. E. Heberlein, which patent was assigned to the assignee of the instant invention. It should be understood that the manner in which the disconnect switch operates lends no novelty to the ground plane appendage of the instant invention and any other suitable mechanism for operating the disconnect switch may be employed.

The hinge assembly is likewise provided with a hinge corona shield arrangement 66 which is secured by straps 67 which are, in turn, secured to the hinge assembly 63 at 68. The hinge terminal pad 69 is designed to receive and rigidly secure the incoming conductor member thereto. While the disconnect switch 40, shown in FIGURES 3 and 4, is of the 500 kv.–200 amp type, and while this was the switch employed in the majority of the experiments referred to herein, it should be understood that the ground plane appendage of the instant invention provides equally favorable results with switches of lower, as well as higher, voltage capacities and the use of the instant invention should in no way be limited to 500 kv. capacity switches.

Although there has been described a preferred embodiment of this novel invention, many variations and modifications will now be apparent to those skilled in the art. Even though the description covers an application of the grounded plane appendage at the jaw end of a disconnecting switch, it may be applied to the hinge end of the switch, or to both ends of the switch, with similar effectiveness. Therefore, this invention is to be limited, not by the specific disclosure herein, but only by the appending claims.

The embodiments of the invention in which an exclusive privilege or property is claimed are defined as follows:

1. A disconnect switch comprising a base structure; first and second insulator support columns secured to said base structure in a spaced parallel manner; a disconnect switch jaw assembly secured atop said first column, a disconnect switch hinge assembly secured atop said second column; said hinge assembly having a rotatable switchblade for making selective engagement with said jaw assembly; a ground plane appendage secured to said base structure; said appendage being a horizontally aligned substantially planar conductive member of substantial cross-sectional area relative to portions of said disconnect switch which may become energized; means for electrically grounding said conductive member.

2. The device of claim 1 wherein the distance between said conductive member and said jaw assembly is less than the open gap distance between said jaw assembly and said hinge assembly.

3. The device of claim 1 wherein said planar conductive member extends in a direction substantially away from the open gap region between said hinge and jaw assemblies.

4. The device of claim 1 wherein the distance between said conductive member and said jaw assembly is less than the open gap distance between said jaw assembly and said hinge assembly; said planar conductive member being elevated a predetermined distance above the top of said base structure.

5. The device of claim 1 wherein said planar conductive member extends in a direction substantially away from the open gap region between said hinge and jaw assemblies, and adjacent said first column.

6. The device of claim 1 wherein said planar conductive member extends in a direction substantially away from the open gap region between said hinge and jaw assemblies, and adjacent said second column.

7. The device of claim 1 wherein said conductive member is substantially rectangular.

References Cited by the Examiner

UNITED STATES PATENTS

| | | | |
|---|---|---|---|
| 2,355,490 | 8/1944 | Wayman | 317—61 |
| 3,117,192 | 1/1964 | Owens | 200—48 |

ROBERT K. SCHAEFER, *Primary Examiner.*

H. HOHAUSER, *Assistant Examiner.*